United States Patent
Stevens

(10) Patent No.: US 8,762,682 B1
(45) Date of Patent: Jun. 24, 2014

(54) DATA STORAGE APPARATUS PROVIDING HOST FULL DUPLEX OPERATIONS USING HALF DUPLEX STORAGE DEVICES

(75) Inventor: Curtis E. Stevens, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 419 days.

(21) Appl. No.: 12/830,263

(22) Filed: Jul. 2, 2010

(51) Int. Cl.
*G06F 12/10* (2006.01)
*G06F 9/30* (2006.01)

(52) U.S. Cl.
CPC .......... *G06F 12/1027* (2013.01); *G06F 9/3004* (2013.01)
USPC ............................ 711/202; 711/206; 711/155

(58) Field of Classification Search
CPC ........................... G06F 12/1027; G06F 9/3004
USPC .......................................... 711/202, 206, 155
See application file for complete search history.

(56) References Cited

U.S. PATENT DOCUMENTS

| | | | |
|---|---|---|---|
| 5,249,231 A | 9/1993 | Covey et al. |
| 5,537,417 A | 7/1996 | Sharma et al. |
| 5,974,541 A | 10/1999 | Hall et al. |
| 6,138,180 A | 10/2000 | Zegelin |
| 6,226,741 B1 | 5/2001 | Shen et al. |
| 6,279,060 B1 | 8/2001 | Luke et al. |
| 6,286,061 B1 | 9/2001 | Ross |
| 6,378,004 B1 | 4/2002 | Galloway et al. |
| 6,439,464 B1 | 8/2002 | Fruhauf et al. |
| 6,457,069 B1 | 9/2002 | Stanley |
| 6,484,219 B1 | 11/2002 | Dunn et al. |
| 6,490,636 B1 | 12/2002 | Kikuchi et al. |
| 6,505,268 B1 | 1/2003 | Schultz et al. |
| 6,631,159 B1 | 10/2003 | Morris |
| 6,647,452 B1 | 11/2003 | Sonoda |
| 6,671,765 B1 | 12/2003 | Karlsson et al. |
| 6,675,243 B1 | 1/2004 | Bastiani et al. |
| 6,681,282 B1 | 1/2004 | Golden et al. |
| 6,704,819 B1 | 3/2004 | Chrysanthakopoulos |
| 6,704,824 B1 | 3/2004 | Goodman |
| 6,721,885 B1 | 4/2004 | Freeman et al. |
| 6,735,720 B1 | 5/2004 | Dunn et al. |
| 6,742,055 B2 | 5/2004 | Matsunaga |
| 6,754,817 B2 | 6/2004 | Khatri et al. |
| 6,766,480 B2 | 7/2004 | Oldfield et al. |

(Continued)

FOREIGN PATENT DOCUMENTS

EP 2180410 4/2010
WO 03023629 9/2001

OTHER PUBLICATIONS

PCT Search Report and Written Opinion in corresponding application PCT/US 11/34633 dated Jul. 18, 2011, 8 pages.

(Continued)

*Primary Examiner* — Than Nguyen

(57) ABSTRACT

A data storage apparatus includes a command processor that receives write commands and data blocks from a host, the write commands comprising block ID's (BID) corresponding to data blocks; storage resources including semiconductor memory and mass storage; a data manager that selects storage resources and allocates selected resources to block ID's; a translation table to map a storage resource to the allocated block ID, and storage resources that are selected after receipt of the write command. A method is further provided for increasing performance in a storage device comprising a plurality of storage resources, transferring data to a storage resource that is available to transfer the data.

25 Claims, 2 Drawing Sheets

(56) References Cited

U.S. PATENT DOCUMENTS

| | | |
|---|---|---|
| 6,795,872 B2 | 9/2004 | Page et al. |
| 6,901,473 B2 | 5/2005 | Klissner |
| 6,901,596 B1 | 5/2005 | Galloway |
| 6,907,458 B2 | 6/2005 | Tomassetti et al. |
| 6,910,070 B1 | 6/2005 | Mishra et al. |
| 6,928,562 B2 | 8/2005 | Cohen et al. |
| 6,963,986 B1 | 11/2005 | Briggs et al. |
| 6,976,080 B1 | 12/2005 | Krishnaswamy et al. |
| 7,013,336 B1 | 3/2006 | King |
| 7,082,598 B1 | 7/2006 | Le et al. |
| 7,100,040 B2 | 8/2006 | Fortin et al. |
| 7,197,578 B1 | 3/2007 | Jacobs |
| 7,231,501 B2 | 6/2007 | Azevedo et al. |
| 7,243,200 B2 | 7/2007 | Day et al. |
| 7,260,749 B2 | 8/2007 | Cox |
| 7,266,625 B2 | 9/2007 | Sakaki et al. |
| 7,272,745 B2 | 9/2007 | Seto |
| 7,281,074 B2 | 10/2007 | Diefenbaugh et al. |
| 7,451,454 B2 | 11/2008 | Chen et al. |
| 7,457,887 B1 | 11/2008 | Winkler et al. |
| 7,457,914 B2 | 11/2008 | Cordella et al. |
| 7,546,357 B2 | 6/2009 | Manchester et al. |
| 7,548,994 B2 | 6/2009 | Ali et al. |
| 7,554,274 B2 | 6/2009 | Wang et al. |
| 7,565,108 B2 | 7/2009 | Kotola et al. |
| 7,568,132 B2 | 7/2009 | Nakayama et al. |
| 7,577,748 B2 | 8/2009 | Yoshida |
| 7,589,629 B2 | 9/2009 | Tupman et al. |
| 7,689,744 B1 | 3/2010 | McCarty et al. |
| 7,706,820 B2 | 4/2010 | Yamaki |
| 7,752,029 B2 | 7/2010 | Tamayo et al. |
| 7,752,340 B1 | 7/2010 | Porat et al. |
| 7,792,046 B2 | 9/2010 | Kucharczyk et al. |
| 8,165,301 B1 | 4/2012 | Bruce et al. |
| 8,180,931 B2 | 5/2012 | Lee et al. |
| 8,260,885 B2 | 9/2012 | Lindstrom |
| 8,285,923 B2 | 10/2012 | Stevens |
| 2002/0103943 A1 | 8/2002 | Lo et al. |
| 2003/0037171 A1 | 2/2003 | Madineni et al. |
| 2003/0233154 A1 | 12/2003 | Kobziar |
| 2004/0236897 A1 * | 11/2004 | Cheng ............... 711/103 |
| 2004/0243737 A1 | 12/2004 | Beardsley et al. |
| 2004/0243738 A1 | 12/2004 | Day et al. |
| 2004/0264284 A1 | 12/2004 | Priborsky et al. |
| 2005/0027894 A1 | 2/2005 | Ayyavu et al. |
| 2005/0038791 A1 | 2/2005 | Ven |
| 2005/0086397 A1 | 4/2005 | Huffman et al. |
| 2005/0160320 A1 | 7/2005 | Elez |
| 2005/0171970 A1 | 8/2005 | Ozzie et al. |
| 2006/0053234 A1 | 3/2006 | Kumar et al. |
| 2006/0067209 A1 | 3/2006 | Sheehan et al. |
| 2006/0095693 A1 | 5/2006 | Aida et al. |
| 2006/0159109 A1 | 7/2006 | Lamkin et al. |
| 2006/0271676 A1 | 11/2006 | Talayco et al. |
| 2006/0280149 A1 | 12/2006 | Kuhl et al. |
| 2007/0011360 A1 | 1/2007 | Chang et al. |
| 2007/0174509 A1 | 7/2007 | Day et al. |
| 2007/0204089 A1 | 8/2007 | Proctor |
| 2008/0005116 A1 | 1/2008 | Uno |
| 2008/0005311 A1 | 1/2008 | Ali et al. |
| 2008/0046612 A1 | 2/2008 | Beardsley et al. |
| 2008/0071940 A1 | 3/2008 | Kim et al. |
| 2008/0126628 A1 | 5/2008 | Mullis et al. |
| 2008/0204089 A1 | 8/2008 | Nakasha |
| 2009/0037622 A1 | 2/2009 | Dheeresh et al. |
| 2009/0124375 A1 | 5/2009 | Patel |
| 2009/0177815 A1 | 7/2009 | Nemazie et al. |
| 2010/0057966 A1 | 3/2010 | Ambikapathy et al. |
| 2010/0115143 A1 | 5/2010 | Nakajima |
| 2010/0169686 A1 | 7/2010 | Ryoo et al. |
| 2010/0298718 A1 | 11/2010 | Gilham et al. |
| 2011/0029808 A1 * | 2/2011 | Moshayedi ............... 714/6 |
| 2011/0055494 A1 * | 3/2011 | Roberts et al. ............ 711/154 |
| 2011/0219163 A1 | 9/2011 | Beadnell et al. |

OTHER PUBLICATIONS

PCT Search Report in corresponding application PCT/US 11/34633 dated Jul. 18, 2011, submitted herewith.

* cited by examiner

DATA STORAGE APPARATUS PROVIDING HOST FULL DUPLEX OPERATIONS USING HALF DUPLEX STORAGE DEVICES

BACKGROUND

The use of data storage devices has become ubiquitous in homes as well as businesses. Demand for higher performance as well as flexibility and expandability provides a challenging environment with currently available solutions. Home applications require user friendly attachment and simple expansion for increasing storage capacity and/or performance. Add-on storage, such as external desktop drives, network attached drives, and portable hard drives are widely used for storage of home entertainment, photos, and home office applications. Home entertainment such as Digital Video Recorders (DVR), expanders, and media players push data storage requirements and performance speeds higher.

As the demands for expandability and higher performance grow, communications channels have increased their speed and in some cases outpaced the ability of storage devices to provide all the performance that might otherwise be achieved.

Newer communication channels have advanced to be able to communicate in two directions at the same time, for example, writing data and reading data simultaneously over a single connection. In home entertainment applications such as DVR's this is useful, for example, when recording one program while watching another program at the same time.

Current storage solutions that incorporate storage devices, such Hard Disk Drives (HDD), Solid State Drives (SSD), or semiconductor memories may limit performance or expandability since they are limited by the underlying devices they contain.

The products that incorporate underlying storage devices, or attach to storage devices are called bridges.

Bridges may be stand alone devices incorporating underlying storage, such as a DVR or desktop storage used for direct attachment to a computer. In some cases, the bridge is provided and the user provides data storage to be attached to the bridge. Some bridges incorporate storage and also allow for additional external storage.

DETAILED DESCRIPTION

Figure 1:
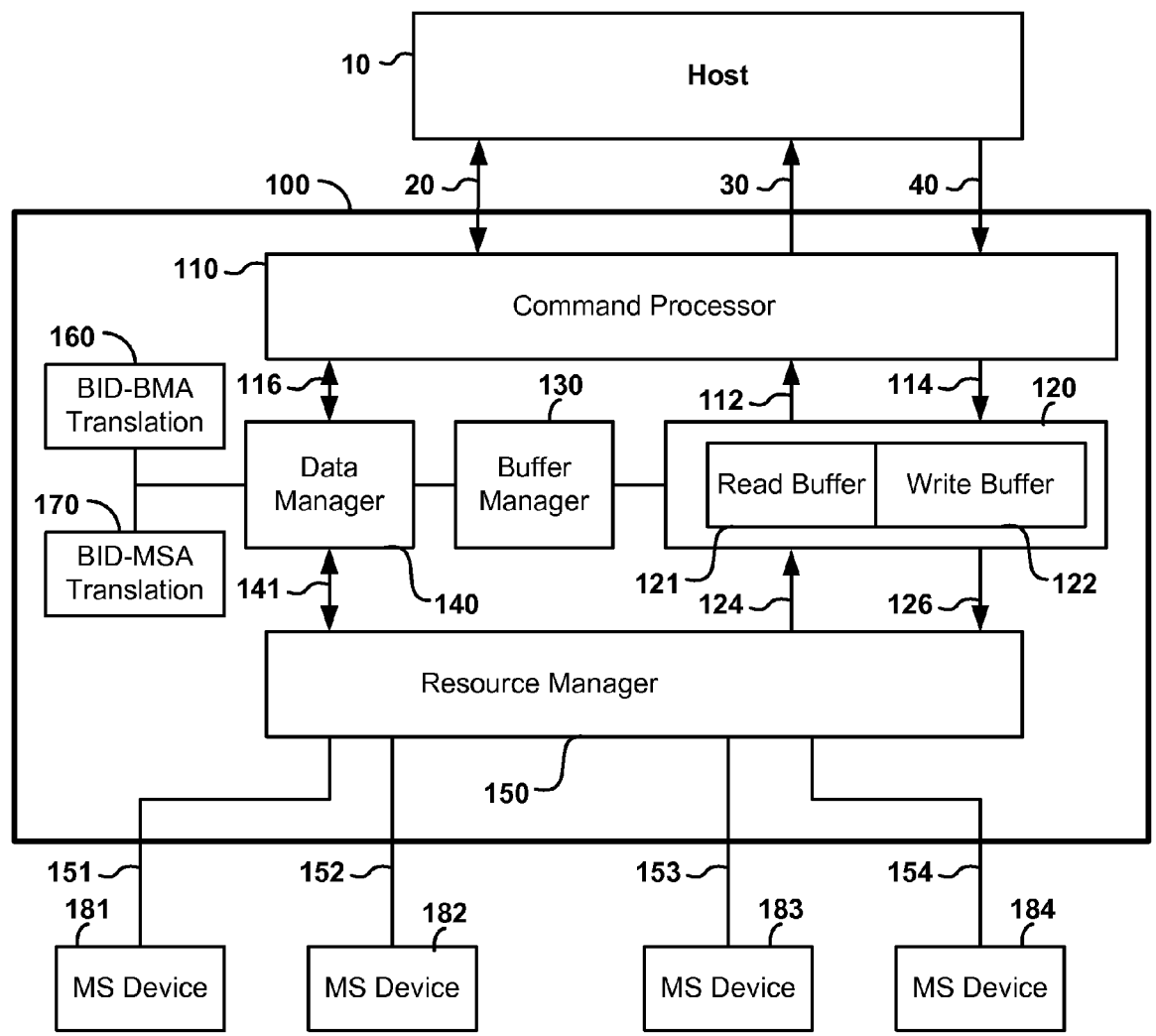
FIG. 1 illustrates a block diagram of an embodiment of the invention.

FIG. 1 illustrates a block diagram of an embodiment of the invention. A bridge 100 comprises a command processor 110 for connection to a host 10; a data manager 140, a buffer manager 130, semiconductor memory 120, resource manager 150, and connections to any number of Mass Storage (MS) devices as exemplified by MS devices 181-84.

Bridge 100 is operatively connected to a host 10. The host 10 may be, for example, a desktop computer, a server, a notebook computer, or an application specific controller. Any apparatus that is capable of sending commands and data to the bridge 100 is hereinafter referred to as a host.

In one embodiment, the interface between the host 10 and the bridge 100 may be a Universal Serial Bus interface, commonly referred to as a USB interface. The USB interface also may be referred to as USB-1, USB-2, or USB-3, and future revisions may be expected. Universal Serial Bus is specified by the Universal Serial Bus Specification, version 2.0 released Apr. 27, 2000, and version 3.0 dated Nov. 12, 2008; available from the USB Implementers Forum, Inc., at www.USB.org.

Other standards are also available for hardware and software connection between computers or other hosts and peripherals, such as bridge 100. Some widely adopted examples include AT Attachment (ATA), also known as AT Attachment-8-Parallel Transport (ATA8-APT), Serial Attached SCSI (SAS), or Serial ATA (SATA or eSATA), or USB Attached SCSI (UAS) communication interfaces. Specifications for these standards are readily available. Other wired or wireless interfaces may also connect host 10 and bridge 100.

In some embodiments, the command processor 110 includes a disk drive controller or standard peripheral interface controller capable of performing the operations required of the interface between the host 10 and the bridge 100. Interface controllers are used, for example, in disk drives and USB devices; and numerous embodiments exist. Any command processor embodiment that performs the host interface protocol and able to send and receive data into a buffer will work with the invention. Embodiments that support full duplex operation require that read path 30 and write path 40 be capable of transferring data simultaneously. For example, USB-3 supports full duplex operation.

In the embodiment shown in FIG. 1, the command processor 110 receives commands through a command interface 20, writes data thorough write path 40, and reads data through read path 30. Although shown as separate interfaces to simplify explanation, the paths 20, 30, and 40 may be shared. In some embodiments, commands or write data may both be sent on the same path 40; and status or read data on the same path 30. Similarly, all communications such as commands and data may be exchanged across a bidirectional path 20.

In embodiments of the invention, the MS devices 181-84 may be non-volatile (NV) memory, for example, a hard disk drive (HDD), a solid state drive (SSD), or a mix of types. In other embodiments, there may be as few as one, or a large number of MS devices.

In some embodiments, the semiconductor memory 120 may be volatile memory, NV memory, combinations of the same, or the like.

The semiconductor memory 120 may be divided into a read buffer 121 and a write buffer 122. In some embodiments, the read buffer 120 and write buffer 121 are capable of operating to allow simultaneous transfer of read data from the read buffer 121 to the command processor 110 via path 112 and then to the host via path 130; and write data from the host via 40 to the command processor 110 and then to the write buffer 122 via path 114. This simultaneous transfer capability allows for full duplex operation with the host. In some embodiments of the invention, the host may be writing data from one command and reading another command simultaneously.

In the embodiment of the invention shown in FIG. 1, it is not required that the MS devices 181-84 be able to support full duplex operations. The data manager 140 coordinates the transfers between the MS devices and buffers 121 and 122 independently of the transfers between the command processor 110 and the buffers 121 and 122.

References hereinafter to buffers may include the read buffer 121, write buffer 122, or both buffers operating independently or in combination.

The data manager 140 may comprise any suitable control means. In some embodiments, the data manager 140 may comprise a microcontroller or microprocessor, program memory, and application programs. The data manager may also include the capability to control data movements between the command processor 110 and the buffers, and from the buffers to the resource manager 150. Data transfers may also be accomplished in cooperation with a buffer manager 130, which automates data transfers between the command processor 110 and the resource manager 150. In one embodiment, the buffer manager 130 may be a Direct Memory Access (DMA) controller. DMA controllers are well known in the art and provide high performance with low microprocessor overhead.

Data from the host 10 will have a Block Identification (BID), assigned by the host 10, typically provided as part of the host read or write command. Data associated with a BID is referred to as BID data. Data from the host is stored in buffer locations with a Buffer Memory Address (BMA). The BMA may be provided by the data manager 140. A BID to BMA translation may be saved in any suitable manner, for example, a lookup table 160. In some embodiments, the BID may comprise one or more of the following types:
- logical block address (LBA);
- physical block address;
- indirect address;
- file name;
- file length; and
- object oriented storage description.

In some embodiments of FIG. 1, to the extent that the semiconductor memory 120 can provide the needed data storage capacity, the command processor 110, data manager 140 and associated lookup table 160, buffer manager 130, and semiconductor memory 120 comprise a complete functional storage device capable of operating in full duplex mode with the host 10.

In some embodiments of FIG. 1, when a read command is received from the host 10 requesting data previously written to a write buffer 122, the data in the write buffer 122 may be transferred directly from the write buffer 122 to the command processor 110.

Write buffer 122 and read buffer 121 may be separate memories, parts of partitioned memory, or locations in memory that are allocated as needed. The data manager 140 and buffer manager 130 can allocate semiconductor memory 120 to be used as write or read buffers and move write data from path 114, and read data to path 112 as needed to implement the commands.

In some embodiments, the designation of semiconductor memory resources allocated to write buffer or read buffer may be switched, allowing data in a write buffer portion to be designated as a read buffer portion, and data in a read buffer portion to be designated as a write buffer portion.

In another embodiment, if a host read command is received requesting data previously written to write buffer 122, the data in the write buffer 122 may be transferred to the read buffer 121 before being transferred to the command processor 110. The data transfer may be accomplished by data manager 140 and buffer manager 130.

In further embodiments of the invention, an intermediate buffer may be provided. When a read command is received requesting data previously written to write buffer 122, the data in the write buffer 122 may be transferred to the intermediate buffer and then from the intermediate buffer to read buffer 121 prior to being transferred to the command processor. The intermediate buffer may be accomplished by the buffer manager 130 as another memory, as registers, or as a combination of input/output reads and writes from the buffers, using methods well known in the art.

Resource manager 150 may be a controller that acts as a host to the MS devices 181-84. The resource manager 150 receives instructions from data manger 140 via path 141, and data from semiconductor memory 120. Write data destined for a MS device 181-84 from write buffer 122 is through path 126. Read data from a MS device is through path 124 to read buffer 121. Since separate paths are provided, data may be written to, and read from the resource manager simultaneously.

In some embodiments, write data from write buffer may be transferred via path 126 through the resource manager and written to a first MS device, for example MS device 181 through path 151. Simultaneously, read data may be read from a second MS device, for example MS device 182 through path 152, and transferred through the resource manager 150 via path 124 to read buffer 121.

Data transfers may also be accomplished in cooperation with a buffer manager 130, which automates data transfers between the command processor 110 and the resource manager 150. Commands and control may also be provided to the resource manager through path 141. Simultaneous read and write transfers may be accomplished, therefore, with any of the MS devices 181-84 through their respective paths 151-54.

In other embodiments, resource manager 150 may act as a bus master capable of fetching data from and sending data to the semiconductor memory 120. Instructions from data manager 140 may provide instructions to the resource manager 150, and the resource manager 150 may act to control the data transfers allowed by data manager 140. Embodiments of DMA transfers with bus masters are well known in the art.

When transfer of data from the buffer to the MS device 181-84 is desired, the data manager will locate the data using the BID to BMA translation table 160. The data manager 140 will assign a Mass Storage Address (MSA) to the data. The MSA will identify a physical MS device, for example, one of MS devices 181-84, and the BID within the MS device to be allocated. The host's BID will be mapped to the MSA and maintained in a BID-MSA translation table 170.

In some embodiments in accordance with FIG. 1, the data manager maintains at least two translation tables, (1) BID to BMA, and (2) BID to MSA, wherein the MSA comprises the host BID and the MS device identification. The MSA is not limited to only this information, and may also include other information such as metadata, without departing from the invention.

The MS devices 181-84 are resources of the bridge 100, not of the host 10. The manner of assigning MSA locations to BID data may therefore be performed independently from host activity and BID assignments, and the host 10 may not be aware of which physical MS device contains its BID data.

This mechanism of making the MS devices 181-84 resources of the bridge 100 allows for allocation of MS resources in the most efficient or best performing manner.

Data transfers between the MS resources and the semiconductor memory 120 are independent of the transfers between the semiconductor memory 120 and the command processor 110.

In embodiments of the present disclosure, the host 10 can maintain full duplex operation with the data contained in the buffer. When the MS devices are only half duplex, one device can be writing and another reading thereby supporting full duplex data transfers to the buffers and thereby to the command processor 110 and the host 10.

Typically, if a host needs to write half-duplex storage that is busy reading data, then the performance will be limited by the storage device's half duplex limitation. The host would need to wait to write the data.

The following description describes some embodiments of the invention that overcome the half duplex limitation of the MS devices.

Because the data manager 140 assigns the physical location where the host BID data will be written and then provides a translation for future operations, the data manager 140 may select the MS device 181-84 that is most convenient. In some embodiments of the invention, it is not necessary for a specific BID to be written to a specific MS device, or even the same MS device as it was previously written. The data manager can simply update the BID to MSA translation table 170 when writing blocks of data.

In an example of such an embodiment, a specific MS device may be busy transferring read data to the buffer, and the host has commanded a write to a BID that is contained on the busy device. The data manager 140 then selects another MS device that is not busy, writes the BID data to the selected MS device, and updates the BID to MSA translation table 170. Updating this table also effectively frees the memory of the busy MS device that previously stored this data, as it will now be listed as free in the table. The performance between the MS devices and the buffer can be effectively doubled, even though no single MS device supports full duplex operation.

The bridge 100, having the ability to assign BID data to any MS device, even a different device than previously assigned, allows the Bridge 100 to perform as a full duplex device across the host interface (paths 20, 30, 40) providing doubled performance by using two MS devices operating in half duplex mode. This is permitted even though read and write operations are addressing BID's contained on the same mass storage device, because BID's being written will be relocated to another device that is able to transfer data.

In some embodiments, additional MS devices may be added at any time to increase the capacity and/or the performance. This capability is accomplished by the data manager extending the BID to MSA translation table 170 to include the new MS devices.

Figure 2:
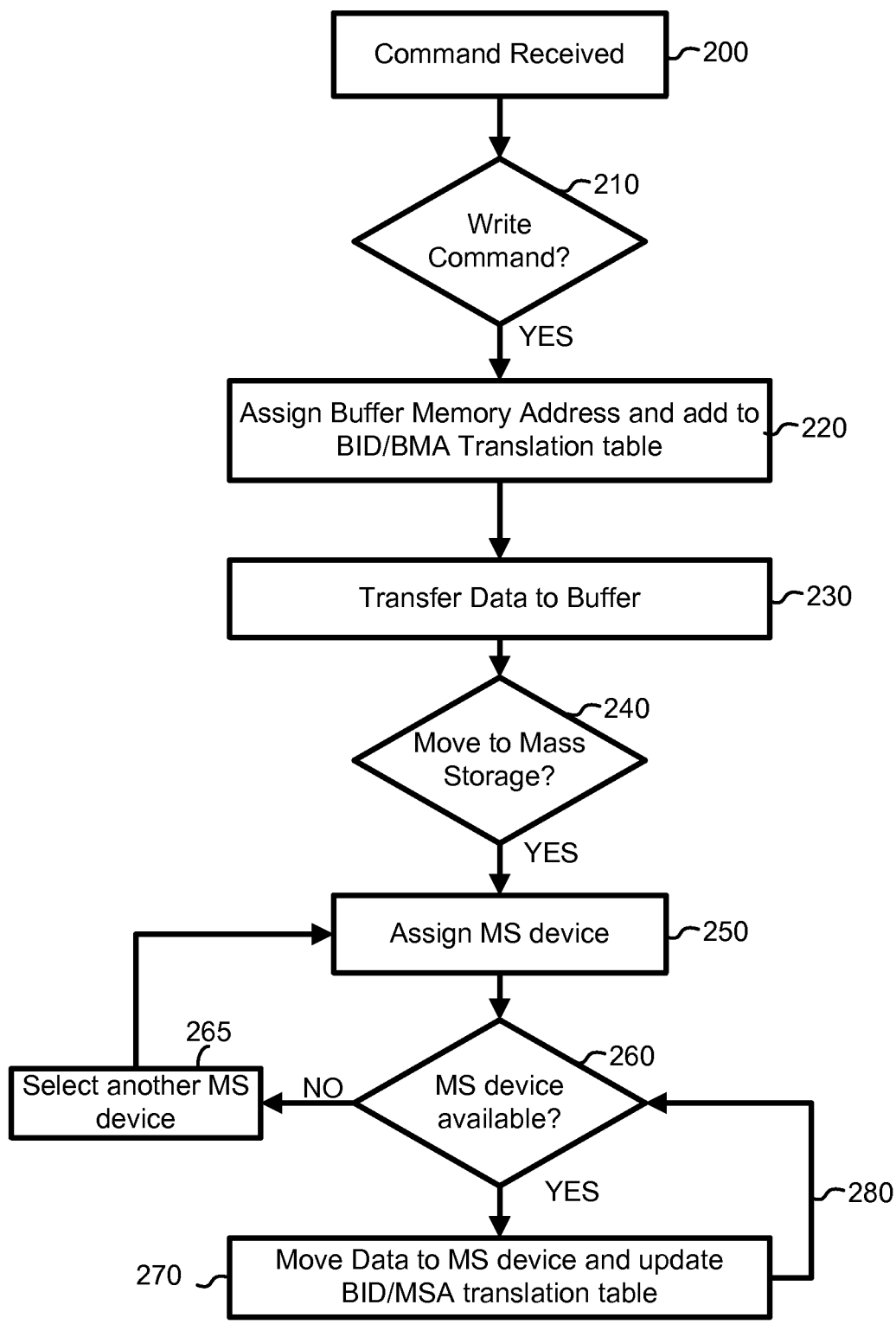
FIG. 2 illustrates a flow chart of an embodiment of the invention.

FIG. 2 illustrates a flow chart of an operation following the embodiment shown in FIG. 1. In this example, write commands are performed as full duplex, even though reads may be occurring on any of the MS devices simultaneously.

Starting in block 200, a command is received from the host 10 by the bridge 100. At block 210, the bridge determines that the command is a write command. At block 220, the data manager 140 assigns a BMA in the semiconductor memory 120 and write buffer 122. The assigned BMA is added to the translation table 160.

In block 230, the command processor 110, data manager 140, and buffer manager 130 transfer the data from the host 10 via path 40, through the command processor 110, and to the write buffer 122 via path 114.

In block 240 a decision is made by the data manager 140 to move the data from the semiconductor memory 120 to mass storage. The data manager 140 assigns a MS device, in this example, MS device 181, in block 250. In block 260, the data manager determines whether the MS device 181 is available to transfer data by inquiry to resource manager 150. The MS device 181 may be unavailable because it is busy with another activity, for example, reading or writing. The MS device 181 may also be unavailable because it is out of capacity. Other reasons may include, for example, that the MS device 181 is off-line, in maintenance, undergoing environmental disturbance, or any other reason that data transfers are not possible or delayed.

If the selected MS device, (MS device 181 in this example) is not available, the data manager 140 selects another MS device (for example, MS device 182) in block 265 and returns to block 250 where the data manager 140 assigns the data to the alternate device. Returning then to block 260, the resource manager 150 determines if the alternate MS device 182 is available. If it is available, the process advances to block 270, and if it not available, the selection process in steps 250, 260, 265 and back to 250 repeat until an available device is found.

In block 270, if MS device 182 is available to transfer data, the data manger 140, buffer manager 130, and resource manger 150 move the data from write buffer 122 via path 126 through the resource manager to path 152, and onto MS device 182. The data manager 140 also updates the BID-MSA translation table 170 (block 270). This update effectively frees the originally assigned data sectors of MS device 181, as the translation table 170 would then indicate that the host some other host BID can be or is assigned to that location.

The data transfers in the foregoing example are simultaneously reading data from MS device 181 and writing data to MS device 182. Although previously the BID may have been written on MS device 181, it now resides on MS device 182.

The embodiment of the invention illustrated in FIGS. 1-2 also provide the ability to interrupt writes to a MS device if that MS device is needed for reading, and continuing the writes on another MS device that is available to take the data, thereby maintaining a full duplex mode of operation. In this embodiment, a write operation that is in progress to an MS device can be interrupted and a read operation started. The interrupted write operation may then be continued on another MS device from where it left off. In another embodiment, the write operation may be aborted and started from the beginning on another MS device. In a further embodiment, a duplicate command may be issued to another MS device that is available to take write data.

In FIG. 2, the path 280 from block 270 to block 260 illustrates an embodiment for interrupting a write process on an MS device and continuing on another MS device. During the movement of data in block 270, the resource manager 150 may determine that the data movement to the selected MS device should be interrupted and continued on another device. By taking path 280, a selection process will again take place. In some embodiments, selection process may occur on a periodic basis during the data movement, such as every block, upon a multiple count of blocks, or upon a convenient point for interruption. By following this process, the write operation can be interrupted and continued repeatedly on different MS devices, thereby maintaining high performance write throughput without sacrificing read performance.

In the embodiment of the invention illustrated in FIGS. 1-2, there is no fixed association of the host assigned BID and the MSA. The host may provide a BID that is comprised of 24 bits of address, and the bridge may allocate them in a larger space, for example MSA comprising 28 bits. This provides an advantageous opportunity to write BID data into any device that is available to transfer data, as illustrated in FIG. 2.

In another embodiment, the host may provide a BID that is comprised of 32 bits and the bridge may allocate them into an MSA comprising, for example, 28 bits. As long as the host does not exceed the capacity of the bridge and its MS devices, the data can be reliably retrieved. This provides an advantage for a host to allocate addresses independently of the limitation of the MS devices addressing capability, and expansion of the storage added only when needed, and independently of the BID range.

Although the foregoing has been described in terms of certain embodiments, other embodiments will be apparent to those of ordinary skill in the art from the disclosure herein. For example, in an alternative embodiment, operations may be performed concurrently, rather than sequentially, thereby improving performance. In another embodiment, data transfers may be performed in a hardware implementation and executed automatically without processor involvement. In some embodiments, the storage devices may be separate devices, or logical units of a single device. Alternatives to embody the invention in combinations of hardware and/or software running on a processor, or as a hardware implementation that is reconfigurable to operate in multiple modes would be design choices apparent to those of ordinary skill in the art. As a consequence, the system and method of the present invention may be embodied as software which provides such programming, such as a set of instructions and/or metadata embodied within a computer readable medium. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

I claim:

1. An apparatus configured to couple to a plurality of data storage resources, comprising:
    a command processor configured to receive a write command and data blocks from a host computing device;
    a resource manager configured as a host to the plurality of data storage resources;
    a data manager coupled to the command processor and to the resource manager and configured to select, after receipt of the write command, one of the plurality of data storage resources according to an availability of the data storage resources to transfer data, the data manager being further configured to issue instructions to the resource manager to allocate the data blocks received from the host to the selected data storage resource; and
    a translation table configured to map the data blocks to the selected data storage resource.

2. The apparatus of claim 1 wherein the plurality of data storage resources comprises at least one of:
    at least one semiconductor memory; and
    at least one mass storage device.

3. The apparatus of claim 2 wherein the at least one mass storage device comprises at least one of a hard disk drive and a solid state drive.

4. The apparatus of claim 2 wherein the data manager is further configured to move data stored in the at least one semiconductor memory to a selected one of the at least one mass storage devices based at least in part on an availability of the selected mass storage device to transfer data.

5. The apparatus of claim 1 wherein the write command comprises a block identification and wherein the translation table maps the block identification to the selected storage resource.

6. The apparatus of claim 1 wherein the data manager is further configured to deselect the selected storage resource when the selected storage resource is not available or becomes unavailable and wherein the data manager is further configured to select an alternate data storage resource from the plurality of data storage resources and alter the translation table from pointing from the first selected storage resource to the alternate data storage resource.

7. The apparatus of claim 1 wherein the plurality of data storage resources comprise data storage blocks; and
    wherein the data manager is further configured to instruct the plurality of data storage resources to invalidate at least one of the data storage blocks that are no longer required to be maintained on the plurality of data storage resources.

8. The apparatus of claim 1 wherein the command processor is further configured to receive a read command from the host, the read command comprising block identifications corresponding to data blocks to be read.

9. The apparatus of claim 8 wherein the command processor is further configured to transfer data from read commands and write commands simultaneously.

10. The apparatus of claim 1 wherein at least one of the plurality of data storage resources comprises an ATA, Serial ATA, Serial attached SCSI, UAS, or Universal Serial Bus device.

11. The apparatus of claim 1 wherein the command processor is coupled the host by a communications link comprising an ATA, Serial ATA, Serial Attached SCSI, UAS, or Universal Serial Bus communication interface.

12. The apparatus of claim 1 wherein at least one of the plurality of data storage resources is not configured to operate in a full duplex mode.

13. A data storage apparatus comprising:
    at least one data storage resource, comprising a total number X of addressable memory blocks addressable in mass storage addresses (MSAs);
    a data manager that is configured to assign an MSA to data received from a host and that is configured to address a number Y of unique block identifiers (BIDs) assigned by the host, the MSA being configured to identify at least one data storage resource and at least one BID within the identified at least one data storage resource, the data manager being further configured to dynamically allocate BIDs to MSAs according to an availability of the at least one data storage resource to transfer data; and
    wherein the number Y of unique BIDs is greater than the number X of MSAs.

14. The data storage apparatus of claim 13, wherein the data manager is further configured to allocate BIDs to any available MSA corresponding to available addressable memory blocks.

15. The data storage apparatus of claim 13, wherein the data manager is further configured to alert the host when the data manager determines that the host is attempting to access a unique BID that has not been assigned to an MSA and all available MSAs are assigned to valid host BIDs.

16. The data storage apparatus of claim 13 wherein the at least one data storage resource comprises a plurality of non-volatile memory devices.

17. The apparatus of claim 13, wherein the data manager is further configured to, when a data storage resource becomes unavailable or delayed, dynamically allocate the BID to another data storage resource.

18. The apparatus of claim 13 wherein:
    the data manager is configured to provide a translation record comprising a translation of BID to MSA of the data storage resource, and
    the data manager is configured to instruct a data storage resource to invalidate MSAs when a BID has been reallocated to another device.

19. The apparatus of claim 13 wherein:
    the data manager is configured to provide a translation record comprising a translation of BID to MSA of the data storage resource, and
    the data manager is configured to instruct a data storage resource to invalidate MSAs on a data storage resource when a command to invalidate the BID that was allocated to the MSA is received from the host.

20. The apparatus of claim 13 wherein the number of MSAs is increased by addition of data storage resources.

21. The apparatus of claim 13 wherein the BID comprises metadata.

22. The apparatus of claim 13 wherein the plurality of data storage resources comprises at least one of:
   at least one semiconductor memory; and
   at least one mass storage device.

23. The apparatus of claim 22 wherein the at least one mass storage device comprises at least one of a hard disk drive and a solid state drive.

24. The apparatus of claim 21 wherein the metadata comprises at least one of the following:
   a logical block address;
   a physical block address;
   an indirect address;
   a file name:
   a file length; and
   an object oriented storage description.

25. A method for operating a storage device comprising a plurality of storage resources, comprising:
   receiving a write command and data blocks from a host;
   allocating a first storage resource to store the data blocks received from the host;
   determining that the first storage resource is available to accept the data,
   mapping a first portion of the data blocks to the first storage resource;
   transferring at least the first portion of the data to the first storage resource; and
   when the first data storage resource is not available or becomes unavailable to transfer data:
      locating a second storage resource that is available to accept data;
      mapping a second portion of the data blocks to the second storage resource; and
      transferring at least the second portion of the data to the second storage resource.

* * * * *